United States Patent [19]

Gellert

[11] 4,355,460
[45] Oct. 26, 1982

[54] SPRUE BUSHING AND METHOD OF MANUFACTURE

[76] Inventor: Jobst U. Gellert, 233 Armstrong Ave., Georgetown, Ontario, Canada, L7G 4X5

[21] Appl. No.: 234,641

[22] Filed: Feb. 17, 1981

Related U.S. Application Data

[63] Continuation-in-part of Ser. No. 217,115, Dec. 17, 1980, abandoned.

[51] Int. Cl.³ ............................................. H05B 3/00
[52] U.S. Cl. ...................................... 29/611; 219/424
[58] Field of Search .................. 29/611; 219/420, 421, 219/424, 530, 535, 523, 540, 541, 544, 426, 427

[56] References Cited

U.S. PATENT DOCUMENTS

| | | | |
|---|---|---|---|
| 3,849,630 | 11/1974 | Holliday | 219/535 |
| 4,032,046 | 6/1977 | Elliott et al. | 222/146 HE |
| 4,238,671 | 12/1980 | Gellert | 219/421 |

*Primary Examiner*—Leon Gilden
*Attorney, Agent, or Firm*—Riches, McKenzie & Herbert

[57] ABSTRACT

This invention relates to an improved method of making a sprue bushing for injection molding and the improved sprue bushing made thereby. The runner passage extends through a corrosion resistant inner core portion with an outer surface around which a helical electrical heating element is located. A stainless steel outer sleeve extends between an enlarged front portion which provides the opening to the gate and an enlarged back collar portion which provides for connection to the heating element leads. The space around the heating element is filled by a highly conductive material such as a beryllium copper alloy in a vacuum furnace which causes the beryllium copper to fuse with the adjacent materials. This improves the transfer of heat from the heating element to the melt and the outer sleeve substantially reduces the costly machining required to produce the finished product as well as provides additional strength. In one embodiment, wells extending into the front portion are filled with the highly conductive material which increases heat transferred to the gate area. A thermocouple may be located in one of the wells to monitor the transfer of heat to this area.

11 Claims, 9 Drawing Figures

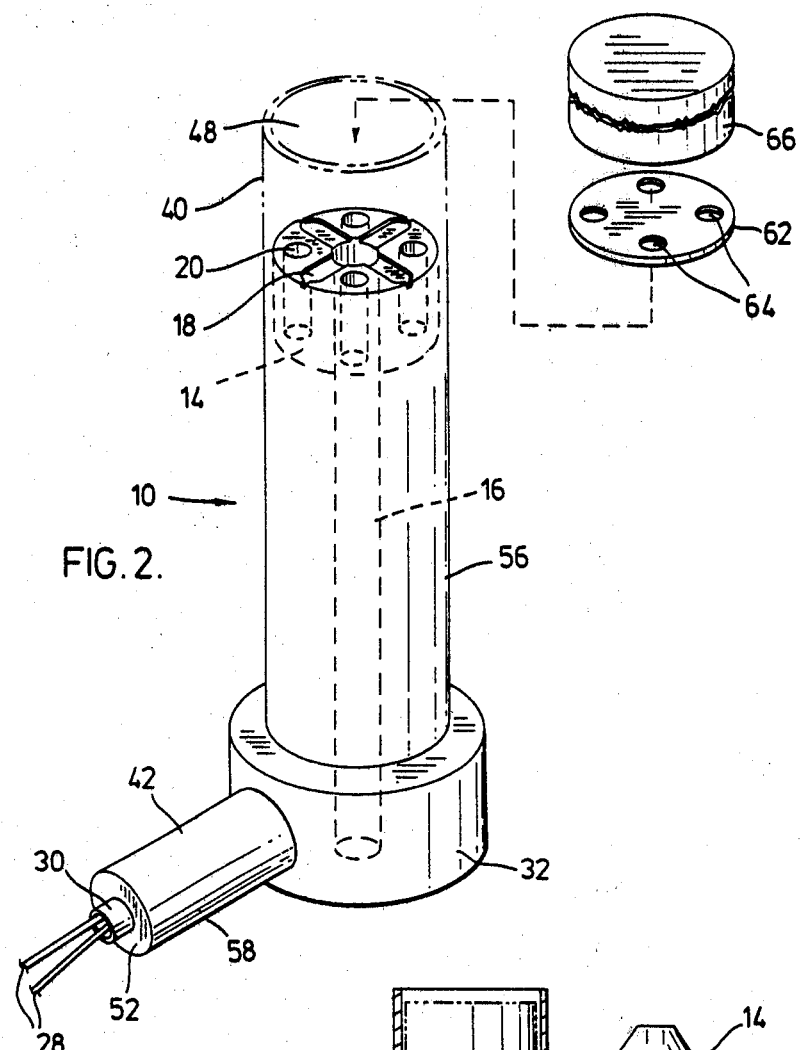
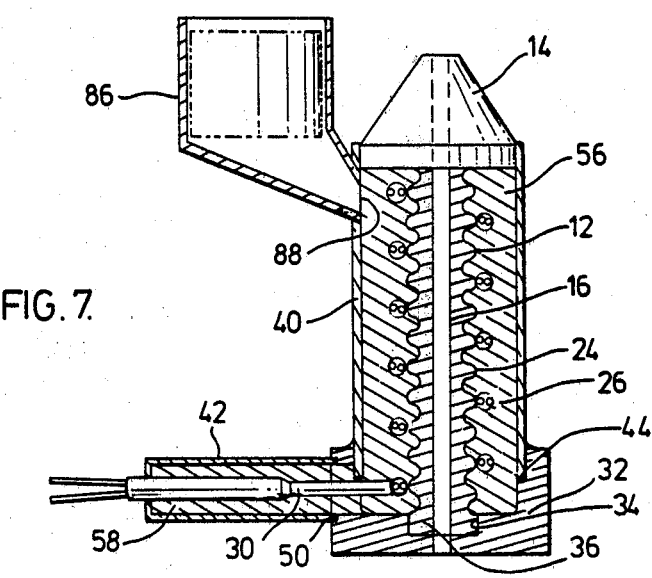

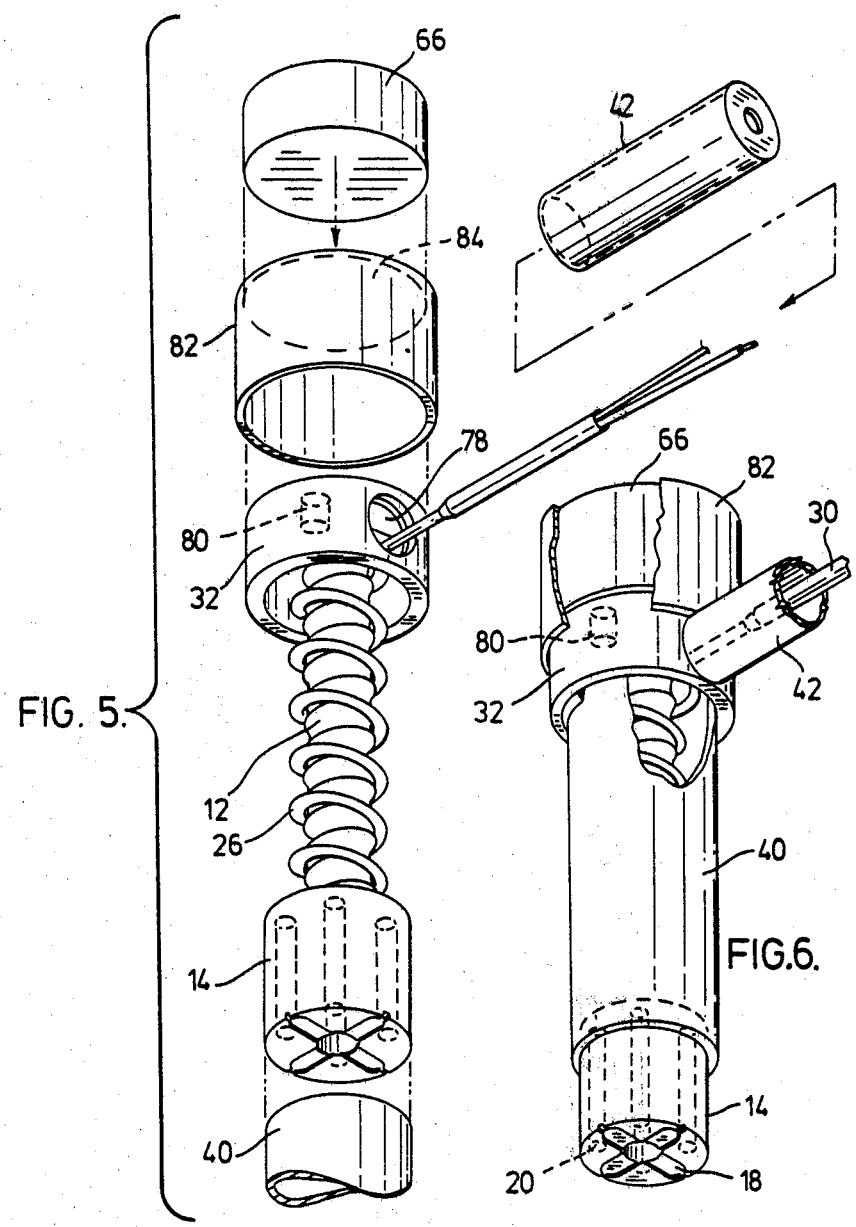

SPRUE BUSHING AND METHOD OF MANUFACTURE

This application is a continuation-in-part of co-pending application Ser. No. 217,115 filed Dec. 17, 1980 now abandoned.

BACKGROUND OF THE INVENTION

This invention relates to injection molding and more particularly to an improved electrically heated sprue bushing and method of making the same.

The sprue bushing of the present invention represents an improvement over the sprue bushing disclosed in the applicant's previous U.S. patent application Ser. No. 36,880 filed May 8, 1979 now U.S. Pat. No. 4,238,671. It relates to the same type of structure with a helical heating coil embedded in a highly heat conductive material cast over an inner core portion formed of a corrosive resistant material, but it also includes a finished outer sleeve portion. The previous sprue bushing has the disadvantage that its outer surface is formed by the cast material. This requires that the outer surface of each sprue bushing be machined to provide the necessary smooth finish. Furthermore, the highly conductive material which is usually a beryllium copper alloy does not have sufficient corrosion resistance to provide a durable outer casing of a sprue bushing. This has resulted in it requiring a costly nickel plating process to protect it from corrosive gases escaping from the gate area.

The process of making the applicant's previous sprue bushing therefore has the serious disadvantages that costly machining and plating steps are required after casting. Furthermore, the even application of heat along the runner passage is critical and therefore it is important that there be optimum heat transfer between the heating element and the surrounding conductive material and between the conductive material and the inner core portion through which the runner passage extends. Resistance to heat transfer at the interfaces between the different materials results in uneven temperature distribution which may shorten the life of the heating element and may cause the melt to deteriorate.

SUMMARY OF THE INVENTION

Accordingly, it is an object to at least partially overcome these disadvantages by providing an improved method of making a sprue bushing and an improved sprue bushing produced thereby whereby the high conductive material is cast in a vacuum furnace over the heating element between a corrosion resistant outer sleeve and a corrosion resistant inner core portion. This substantially reduces the finishing steps and improves the bond of the conductive material with the adjacent materials.

To this end, in one of its aspects, the invention provides a method of manufacturing an integral electrically heated sprue bushing having a hollow elongated inner core portion defining a central runner passage extending between an enlarged front portion and an enlarged back collar portion, a helical heating element encircling the inner core portion, a highly conductive elongated portion around the heating element, and an elongated outer sleeve portion over the conductive portion, comprising the steps of: (a) manually assembling the heating element onto the core portion to extend between the front and back portions; (b) securing an outer sleeve in a position to enclose a space around the heating element between the front and back portions to form an assembly with the space being sufficiently sealed to prevent substantial leakage; (c) vacuum filling the space with a highly conductive molten material to provide the intermediate portion; and (d) allowing the highly conductive material to cool sufficiently to solidify.

In another of its aspects, the invention further provides an integral electrically heated sprue bushing comprising: a hollow elongated inner core portion defining a central runner passage extending therethrough, the inner core portion extending between an enlarged front portion and an enlarged back collar portion, the core portion being formed of a corrosion resistant material having an outer surface; a helical heating element having a plurality of coils encircling the inner core portion and lead wires extending through an aperture in the back collar portion, the inner helical diameter of the coils being greater than the maximum outer diameter of the outer surface of the inner core portion; an elongated outer sleeve portion extending between the front portion and the back portion to enclose a first space around the heating element between the front portion and the back portion; a highly conductive portion cast into said space between the inner core portion and the outer sleeve portion; and a further sleeve portion with one end received in the aperture in the back collar portion to receive the lead wires extending therethrough, said further sleeve portion also being filled with highly conductive material to encase the portion of the lead wires extending therethrough.

Further objects and advantages of the invention will appear from the following description taken together with the accompanying drawings.

BRIEF DESCRIPTION OF THE DRAWINGS

FIG. 2 is a similar view illustrating an assembly ready for filling according to the first embodiment;

FIGS. 5 and 6 are isometric views showing assembly for filling in the reverse direction according to a second embodiment of the invention;

FIG. 7 is a sectional view showing an assembly ready for filling of another embodiment of the sprue bushing according to a further embodiment of the invention;

DESCRIPTION OF THE PREFERRED EMBODIMENTS

Figure 1:
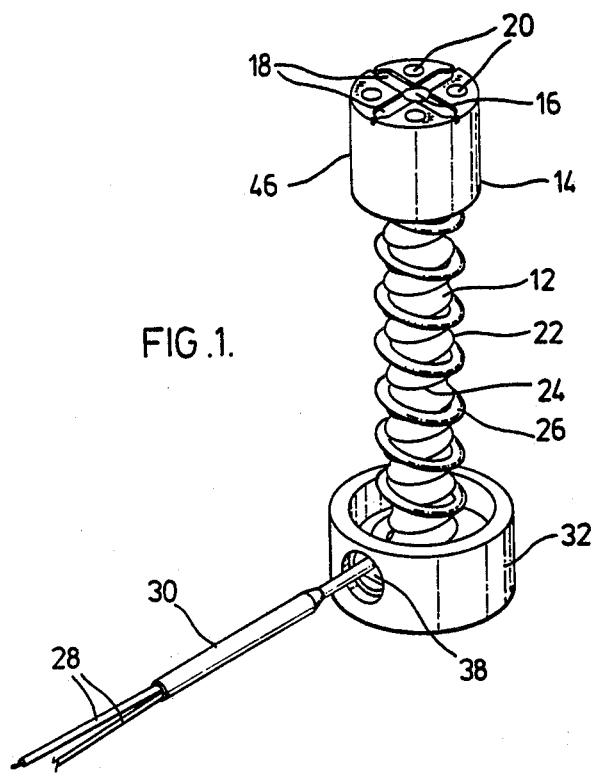
FIG. 1 is an isometric view of a sprue bushing showing partial assembly according to a first embodiment of the invention.

Reference is first made to FIGS. 1 and 2 which show assembly of one embodiment of the sprue bushing according to the preferred method. The assembly 10 has a hollow elongated inner core portion 12 which, in this embodiment, is integral with an enlarged front portion 14. A runner passage 16 extends centrally through the inner core portion and leads to channels 18 which extend radially outward in the front face of the front portion. In use, each of these radial channels conveys melt to a corresponding edge gate. As may be seen, the enlarged front portion 14 has a number of holes or wells 20 extending therethrough, one between each of the radial channels 18. The inner core portion 12 has an undulating outer surface 22 which forms a helical ridge 24 having a uniform curved cross section.

The first step of assembly is to manually insert the innner core portion through a helical heating element 26 which has electrical leads 28 which form an outwardly extending stem 30 at one end. The coils of the heating element are separated so that there is no contact between them and the helical diameter of the heating element 26 is just slightly larger than the maximum outer diameter of the inner core portion 12. The helical heating element 26 spirals in one direction while the helical ridge 24 spirals in the opposite direction so that any contact between them is only at the points where they intersect. The electrical leads or cold terminals 28 extend through the stem 30 to connect to an electrical source (not shown) in a conventional manner.

The next step is to manually add an enlarged back collar portion 32 which has a cylindrical seat 34 to receive the butt end 36 to the inner core portion 12 with a press fit. The back collar portion 32 has a circular aperture 38 through which the electrical leads 28 and stem 30 must be inserted as the back collar portion 32 is added. Next, a larger cylindrical sleeve 40 is installed over the inner core portion 12 and a smaller sleeve or enclosure 42 is installed over the stem. The outer sleeve 40 is inserted into the back collar portion 32 to abut with a press fit on shoulder 44 and is just large enough to form a press fit with the outer surface 46 of the front portion 14. As may best be seen in FIG. 2, the outer sleeve 40 is long enough to extend past the front portion 14 and form an upwardly open mouth 48. The smaller sleeve 42 is inserted into the aperture 38 in the back collar portion 32 to abut on shoulder 50 and is retained in a press fit. It has an end portion or cuff 52 which defines a hole 54 through which the stem 30 extends with a tight fit. Thus, the press fits of the various components are sufficient to provide an assembly 10 which is sufficiently stable to be self supporting. It has an enclosed space 56 around the heating element 26 between the inner core portion 12 and the outer sleeve 40 which extends into a further space 58 around the stem 30.

The next step is to seal the joints between the various components against leakage. This includes the joints between the back collar portion 32 and both sleeves, and the joint between the smaller sleeve 42 and the stem 30. In a preferred embodiment of the invention, this is done by applying a small amount of brazing paste to each joint and then heating the assembly in a vacuum furnace 60 to cause the paste to melt and run all around the joint to braze it and seal it against leakage. The temperature and length of time which the assembly is heated must be sufficient to braze the components together and may also be sufficient to heat treat the components to eliminate a separate heat treating step. Two alternative sealing methods are to weld the joints or apply ceramic cement to them.

Figure 3:
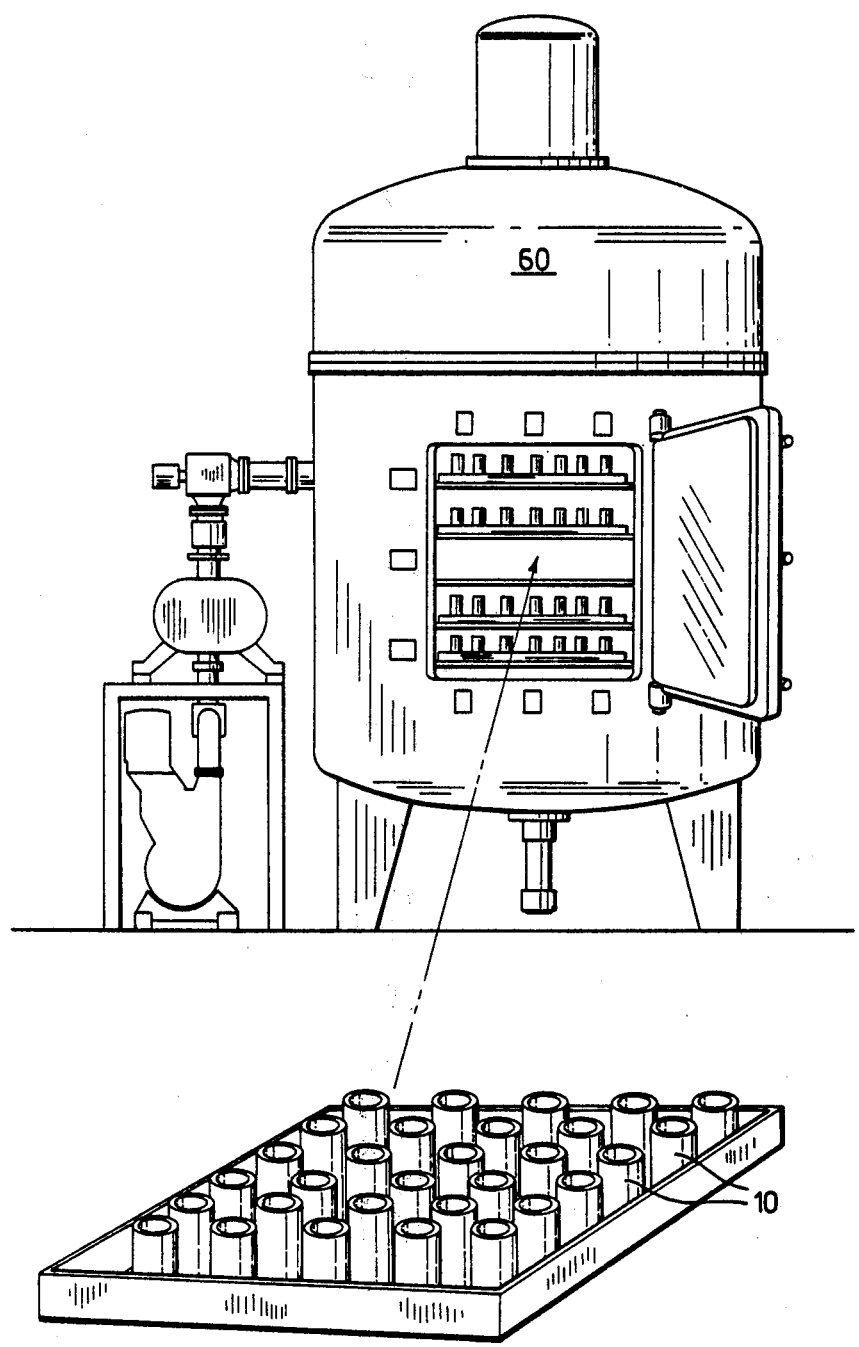
FIG. 3 shows a number of assemblies which are placed in a vacuum furnace for filling.

After sealing, a plug plate 62 is positioned on the front face of the front portion 14 to cover the channels 18. It has holes 64 therethrough which are aligned with wells 20 and a slug 66 of highly conductive material is inserted into the mouth 48 formed by the projecting portion of the outer sleeve 42. The assembly is then inserted into the vacuum furnace 60 in the upright position shown. It is heated until the slug 66 is melted and the molten material flows downward through wells 20 to fill space 56 as well as the further space 58 in the smaller sleeve 42 and the wells themselves. The degree and duration of this second heating step must be sufficient to melt the material and fill the spaces, but cannot be sufficient to release the previously brazed joints. In the preferred embodiment, the inner core portion 12, the front portion 14 and the back collar portion 32 are formed of a highly corrosion resistant material such as stainless steel to withstand the corrosive effects of the melt. The outer sleeve 40 and smaller sleeve 42 are also stainless steel to provide a durable finish and to protect them against corrosive gases escaping from the gate area. The highly conductive material is a beryllium copper alloy, although other copper alloys may be used in other embodiments. Filling under a partial vacuum results in the beryllium copper fusing with the stainless steel and the heating element 26, improving the bond therebetween, and thus increasing the heat transfer from the heating element 26 through the beryllium copper to the inner core portion 12. This, combined with the increased surface contact as a result of undulating surface 22 of the inner core portion 12, provides a more even temperature distribution along the runner passage 16 as well as avoids hot spots along the heating element 26 which are otherwise inefficient and may result in the element burning out. In order to avoid release of the seal during filling, the brazing paste should be selected to have a melting temperature at least about 50° F. above that of the beryllium copper alloy. Heat treating may also be carried out during this filling step if it has not been done during the sealing step or previously. This requires that the heating times and temperatures are appropriate to the assembly materials being treated, as well as to carry out filling without releasing the seal. As illustrated in FIG. 3, assemblies 10 are filled in the vacuum furnace 60 in batches in order to improve the efficiency of manufacture.

Figure 4:
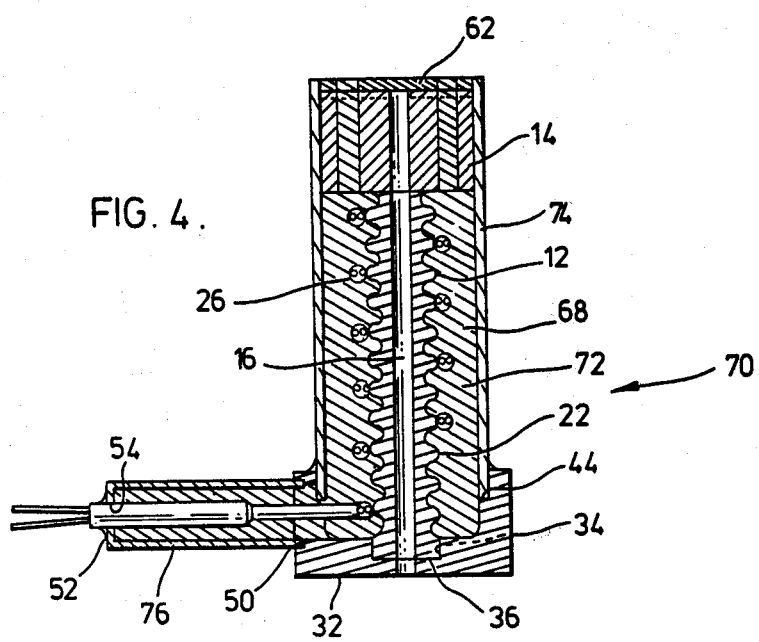
FIG. 4 is a sectional view showing a sprue bushing finished according to the first embodiment of the invention.

After the filled assembly cools, it is finished merely by removing the plug plate 62 and machining to remove the projecting portion of the outer sleeve 40. As seen in FIG. 4, this forms an integral sprue bushing 70 with a highly conductive portion 72 cast over the heating element 26 between the corrosion resistant core portion 12 and outer sleeve portion 74. The conductive portion 72 also extends into a further sleeve portion 76 to encase the leads 28 which extend therethrough. Not only is costly machining of the outer surface of the sprue bushing eliminated, the amount of beryllium copper alloy required is reduced and very little is wasted. In particularly corrosive applications, the inner core portion 12 may be formed of a beryllium nickel alloy, a chromium nickel steel or a chromium nickel alloy such as Inconel. It must have sufficient strength to withstand the repeated high pressure loading, but the integral structure with the outer sleeve portion 74 provides additional strength which allows the thickness of the inner core portion 12 to be reduced which, in turn, improves the heat conductivity from the heating element 26 to the melt.

In use, this particular sprue heating 70 is used for edge gate molding and is installed in a cavity plate to extend between a molding machine and a number of cavities. The cold terminals 28 are connected to a power source and, after the sprue bushing has heated up to operating temperature, operation commences. Melt from the molding machine is injected under very high pressure into the runner passage 16 which conveys it in a molten state to the channels 18 through which it passes to the respective gates and into the cavities. After the cavities are filled, the melt pressure released to provide for ejection of the solidified products and the process is repeated according to a predetermined cycle. The even provision of the minimum sufficient degree of heat along the runner passage is important to the system performing reliably for long periods without malfunction.

Referring now to FIGS. 5 and 6, they illustrate assembly for forming the same sprue bushing by a method of filling in the opposite direction according to a second embodiment of the invention. As most of the features are identical to those described in regard to the method according to the first embodiment, common features are described and illustrated using the same reference numerals. This assembly 10 also has an inner core portion 12 with an undulating outer surface 22 which is integral with an enlarged front portion 14. A runner passage 16 extends centrally through the inner core portion 12 and connects with a number of radial channels 18 in the front face of the front portion 14. A helical electrical heating element 26 is slipped over the inner core portion 12 with its coils just clearing the outer surface 22 of the inner portion 12. As mentioned above, the helical ridge 24 of the outer surface 22 is threaded in the opposite direction to the coils of the heating element 26 so that there is a minimum of contact between them. The front portion 14 has the channels 18 which extend radially outward across its front face from the runner passage 16 and also wells 20 which extend between the channels nearby to the front face. The heating element cold terminals 28 are inserted through a circular aperture 38 in a back collar portion 32 having a cylindrical seat which is then fitted over the end of the inner core portion 12. The smaller sleeve 42 and the larger outer sleeve 40 are then added in the manner described above. The smaller sleeve 42 has a cuff 52 with a hole 54 through which the stem 30 of the heating element extends. One end of the outer sleeve 40 is received in the back collar portion 32, while the outer end forms a press fit over the front 14 to enclose a space 56 around the helical heating element 26.

However, as may be seen, according to this method the assembly 10 is oriented in the opposite direction. The back collar portion 32 has a back wall 78 with at least one filling hole 80 therethrough and a collar 82 is fitted over the back collar portion 32 to form an upwardly open mouth 84. After the assembly 10 is sealed against leakage according to one of the steps described above, a slug 66 containing a predetermined quantity of highly conductive material is placed in the upwardly open mouth 84 and the assembly is heated in the vacuum furnace 60 to melt it. The material runs down through the filling hole 80 to fill the space 56 around the heating element 26 as well as the further space 58 around the leads 28 and the wells 20 in the front portion 14. As described above, filling under a partial vacuum causes the beryllium copper to form an improved contact with the adjacent materials. This increases the effectiveness of heat transfer by the conductive portion 72. This, combined with the added strength provided by the stainless steel outer sleeve portion which allows the corrosion resistance inner portion 12 to be thinner, reduces fluctuations in temperature along the runner passage 16 and temperature build-ups adjacent the coils of the heating element 26.

After filling, the assemblies are removed from the vacuum furnace and allowed to cool. The collar 82 is removed to provide a sprue bushing with little or no finishing required. It is, of course, apparent that other configurations of the front portion 14 could be used to provide for other types of gating.

FIG. 7 illustrates another method of filling the assembly according to the invention. In this embodiment, the assembly steps and components are the same and need not be described further, except that a funnel 86 is inserted into a hole 88 in the outer sleeve 40. The slug 66 of highly conductive material is inserted into the funnel 86 and the assembly is then inserted into the vacuum furnace 60 where it melts and flows down and in between inner core portion 12 and outer sleeve 42. After cooling, the funnel 86 and the extruding portion of the conductive portion 72 are machined off to provide the sprue bushing with a smooth outer finish. In this embodiment, the front portion 14 is provided with a generally conical configuration to provide for straight center gate molding.

Figure 8:
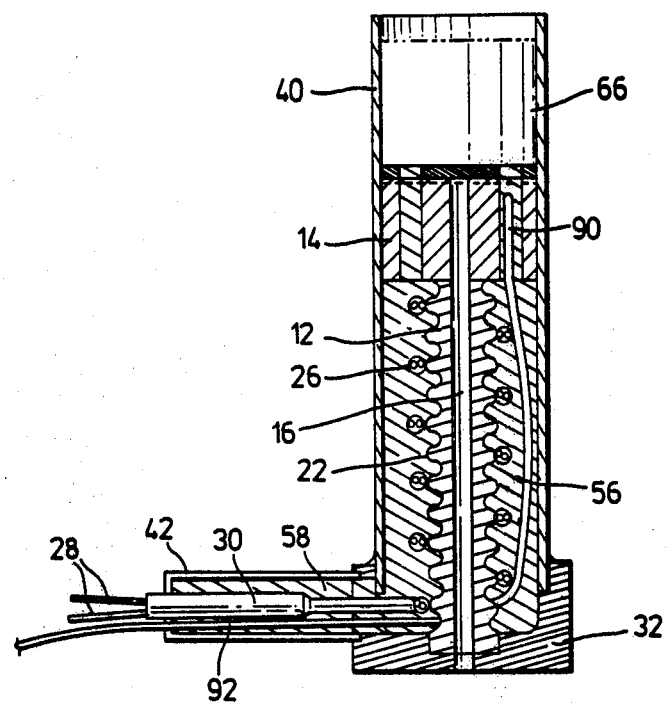
FIG. 8 is a sectional view showing an assembly ready for filling of a further embodiment of the sprue bushing according to the invention.

FIG. 8 shows a sprue bushing assembly according to another embodiment of the invention wherein the assembly components and steps are the same as those described in the foregoing except that a thermocouple 90 with a lead 92 is provided to monitor the temperature near the gate area. As may be seen, the thermocouple lead 92 extends through the smaller sleeve 42 beside the heater element stem 30, through the space 56 between the inner core portion 12 and the outer sleeve portion 74, and into one of the wells 20 where the thermocouple is positioned near the adjacent channels 18. When the assembly is filled by one of the methods described, the thermocouple 90 is covered with the highly conductive material. This protects the thermocouple and the lead and the thermocouple provides an indication of the degree of heat the material is conducting to the area near the gate.

Figure 9:
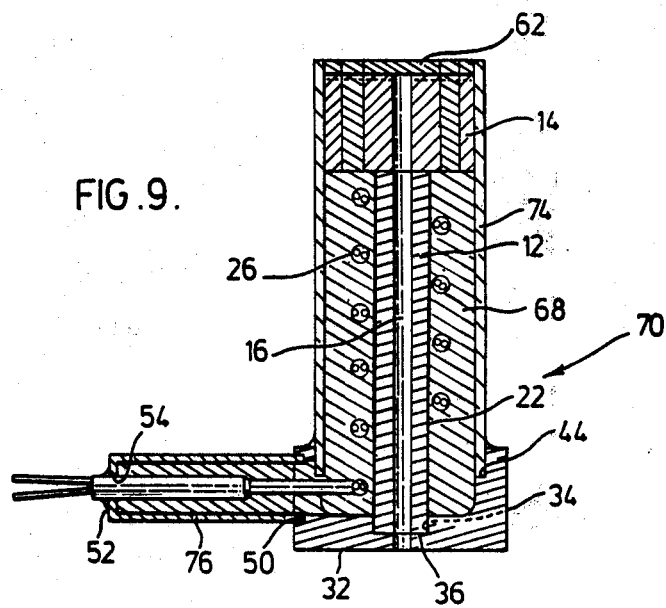
FIG. 9 is a sectional view showing a sprue bushing according to yet another embodiment of the invention.

The sprue bushing 70 shown in FIG. 9 is similar to that shown in the first embodiment except that the inner core portion 12 has a cylindrical outer surface 98 rather than an undulating outer surface. When the sprue bushing is formed according to the method described herein, the highly conductive portion 72 is fused to the cylindrical outer surface 98, providing sufficient heat transfer therebetween. Otherwise, the method of manufacture and use is the same as that described above and need not be repeated.

While the description of the sprue bushing and methods of making it have been provided with respect to several embodiments, it is not to be construed in a limiting sense. Many variations and modifications may now occur to those skilled in the art. In particular, component configurations and materials may be used other than those described provided they have the necessary characteristics. Surfaces may be painted with titanium oxide paint to avoid fusion to the highly conductive filling material referring to the embodiment shown in FIGS. 1 and 2, titanium oxide paint may be applied, for instance, to the front face of the front portion 14 rather than using plug plate 62. Then after the bushing has cooled, the conductive material may be scraped or brushed off to uncover the radial channels 18. Reference is made to the appended claims for a definition of the invention.

I claim:

1. A method of manufacturing an integral electrically heated sprue bushing having a hollow elongated inner core portion defining a central runner passage extending between an enlarged front portion and an enlarged back collar portion, a helical heating element encircling the inner core portion, a highly conductive elongated portion around the heating element, and an elongated outer sleeve portion over the conductive portion, comprising the steps of:

(a) manually assembling the heating element onto the core portion to extend between the front and back portions;

(b) securing an outer sleeve in a position to enclose a space around the heating element between the front and back portions to form an assembly with the space being sufficiently sealed to prevent substantial leakage;

(c) vacuum filling the space with a highly conductive molten material to provide the intermediate portion; and (d) allowing the highly conductive material to cool sufficiently to solidify.

2. A method as claimed in claim 1 wherein the heating element has leads extending through an aperture in the collar portion, including locating a further sleeve with one end received in the aperture and the leads extending through a hole in the other end, sealing said further sleeve against substantial leakage and vacuum filling said further sleeve as well during step (c).

3. A method as claimed in claim 1 wherein step (b) includes placing the outer sleeve in position and then sealing the necessary joints with a ceramic sealant.

4. A method as claimed in claim 1 wherein step (b) includes placing the outer sleeve in position, applying a brazing paste to the necessary joints, and then brazing in a vacuum furnace.

5. A method as claimed in claim 2, 3 or 4 wherein step (c) is carried out in a vacuum furnace at a sufficient temperature to provide adequate filling of the space by the molten material.

6. A method as claimed in claim 2 wherein the front portion has a plurality of wells therein which are also filled with the highly conductive material to provide improved heat transfer.

7. A method as claimed in claim 6 wherein the wells extend through the front portion, and the outer sleeve is positioned to extend past the front portion to form an upwardly open mouth wherein a predetermined quantity of highly conductive material is placed, the assembly is then heated in a vacuum furnace to melt the material which then flows downward through the wells to fill the space around the heating element between the inner core portion and the outer sleeve.

8. A method as claimed in claim 7 wherein the protruding part of the outer sleeve is machined off to finish the outer sleeve portion of the sprue bushing.

9. A method as claimed in claim 2, 3 or 4 wherein the back collar portion has a back wall through which a hole is provided, including locating a further collar over the back collar portion to form an upwardly open mouth, inserting a predetermined quantity of highly conductive material into the mouth, heating the assembly in a vacuum furnace to melt the material to flow downward through said hole in the back collar portion to fill the space around the heating element between the inner core portion and the outer sleeve, and removing the further collar.

10. A method as claimed in claim 2, 3 or 4 wherein a hole is provided through the outer sleeve, including locating funnel means in said hole to form an upwardly open mouth, inserting a predetermined quantity of highly conductive material into the mouth, heating the assembly in a vacuum furnace to melt the material to flow downward through said hole to fill the space around the heating element between the inner core portion and the outer sleeve.

11. A method as claimed in claim 6 including the further step of inserting a thermocouple into one of the wells with a lead thereto extending though the space around the heating element and out through the further sleeve beside the heating element leads, and encasing the thermocouple in the highly conductive material during step (c).

* * * * *